(12) United States Patent
Smith et al.

(10) Patent No.: US 12,122,285 B2
(45) Date of Patent: Oct. 22, 2024

(54) NONREMOVABLE LINKAGE

(71) Applicant: REELSTRONG UTLITY FLEET, Manheim, PA (US)

(72) Inventors: Noel Christian Smith, Manheim, PA (US); Brandon Christ, Manheim, PA (US)

(73) Assignee: Reelstrong LLC, Manheim, PA (US)

( * ) Notice: Subject to any disclaimer, the term of this patent is extended or adjusted under 35 U.S.C. 154(b) by 776 days.

(21) Appl. No.: 17/323,236

(22) Filed: May 18, 2021

(65) Prior Publication Data

US 2021/0354615 A1  Nov. 18, 2021

Related U.S. Application Data

(60) Provisional application No. 63/026,482, filed on May 18, 2020.

(51) Int. Cl.
*B60P 3/035* (2006.01)
*B65H 75/42* (2006.01)

(52) U.S. Cl.
CPC ............ *B60P 3/035* (2013.01); *B65H 75/425* (2013.01)

(58) Field of Classification Search
CPC ....... B60P 3/035; B65H 75/425; B65H 49/38; A47F 7/00
USPC ................................................ 410/47; 296/3
See application file for complete search history.

(56) References Cited

U.S. PATENT DOCUMENTS

| | | | | |
|---|---|---|---|---|
| 2,775,357 | A * | 12/1956 | De Arment | B60P 3/035 414/458 |
| 3,860,193 | A * | 1/1975 | Green | B62D 53/062 414/458 |
| 3,931,902 | A * | 1/1976 | Love, Jr. | B60P 3/035 414/458 |
| 6,932,224 | B1 * | 8/2005 | Sandberg | A47B 81/005 211/70.8 |
| 7,566,196 | B2 * | 7/2009 | French | B65H 49/38 414/458 |
| 11,072,271 | B1 * | 7/2021 | Mesenbrink | B60P 1/4407 |
| 2009/0196723 | A1 * | 8/2009 | Smith | B65H 49/38 242/598.2 |
| 2011/0116902 | A1 * | 5/2011 | Smith | B60P 3/035 242/598.5 |

FOREIGN PATENT DOCUMENTS

| CN | 109399404 | A * | 3/2019 | |
|---|---|---|---|---|
| SU | 1659257 | A1 * | 6/1991 | B60P 3/035 |

\* cited by examiner

*Primary Examiner* — Hilary L Gutman
(74) *Attorney, Agent, or Firm* — McNees Wallace & Nurick

(57) ABSTRACT

A nonremovable linkage for securing a rack assembly to a frame, the linkage securing or automatically securing the rack assembly to the frame at a first position in response to the rack assembly returning to the first position from a second position.

16 Claims, 13 Drawing Sheets

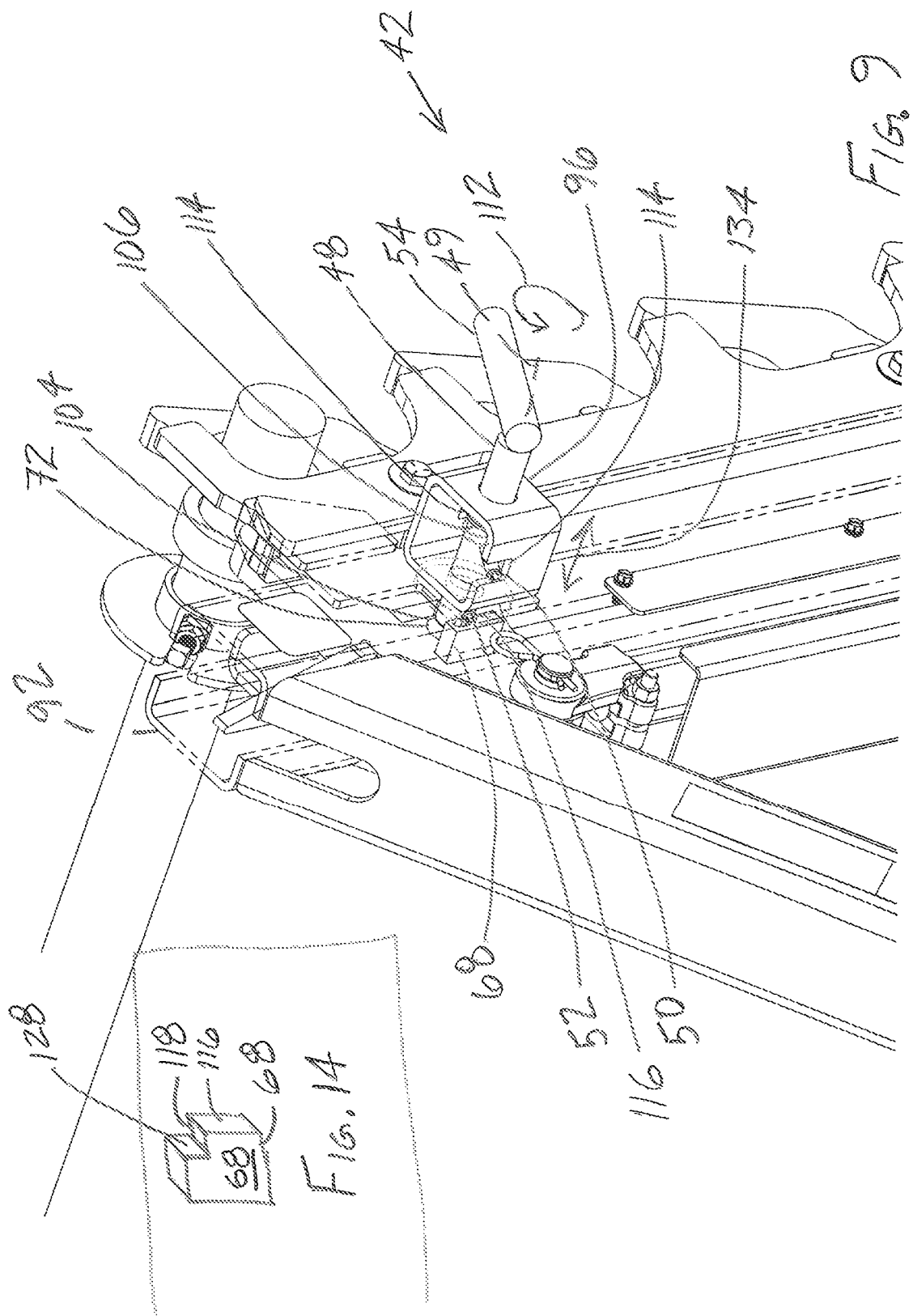

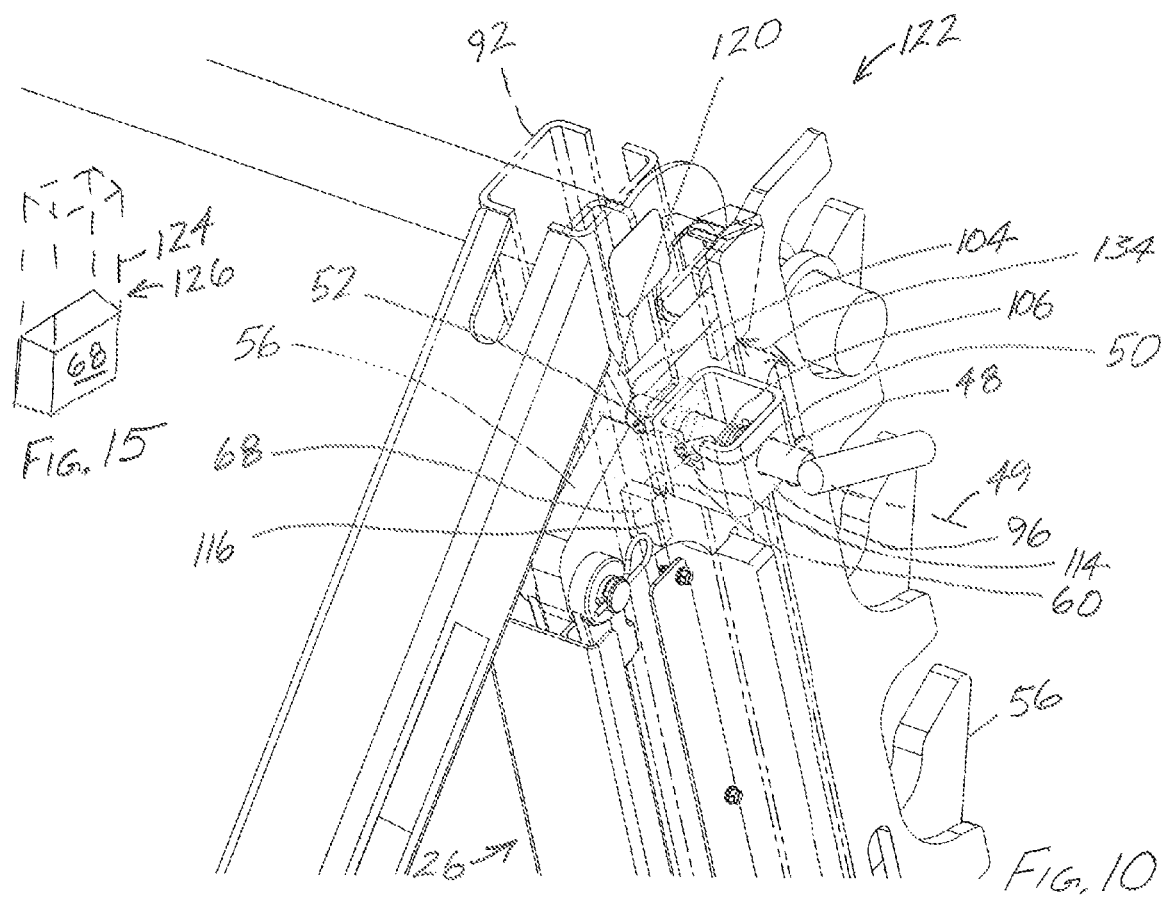

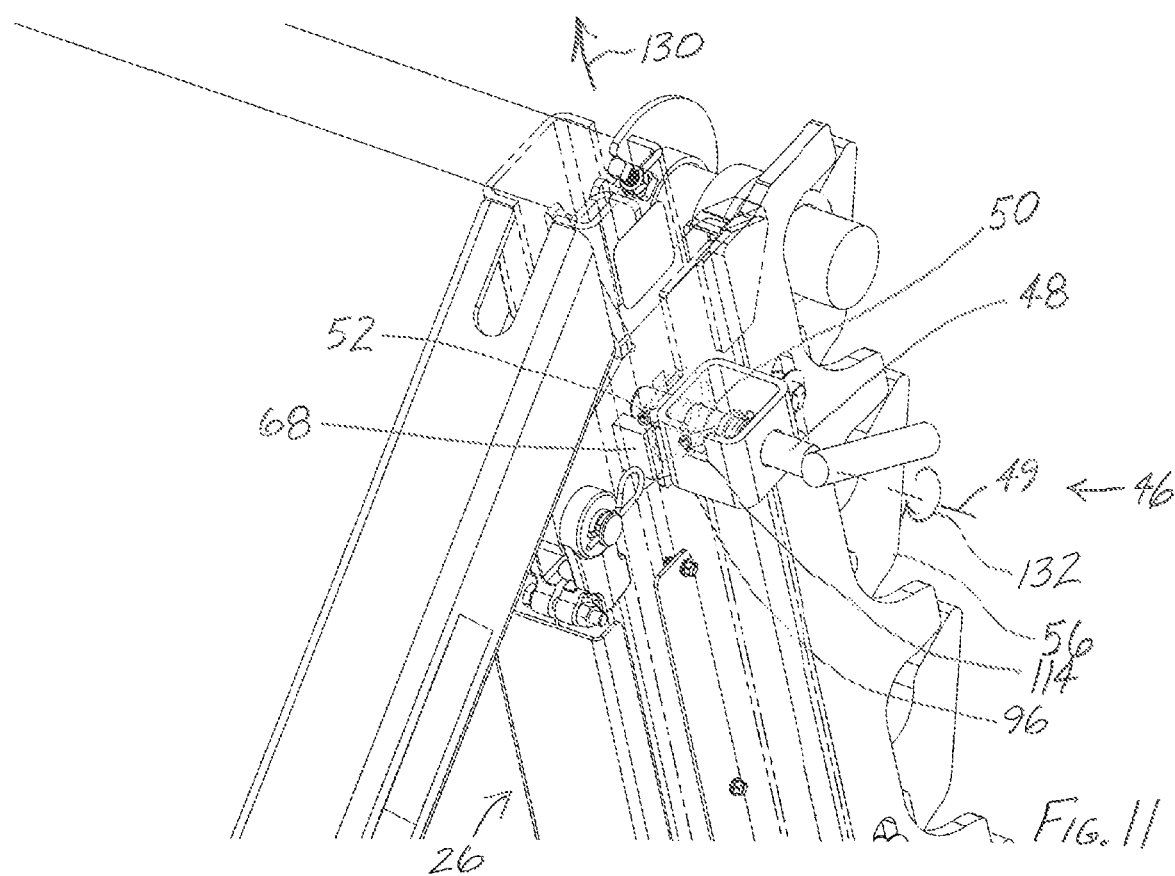

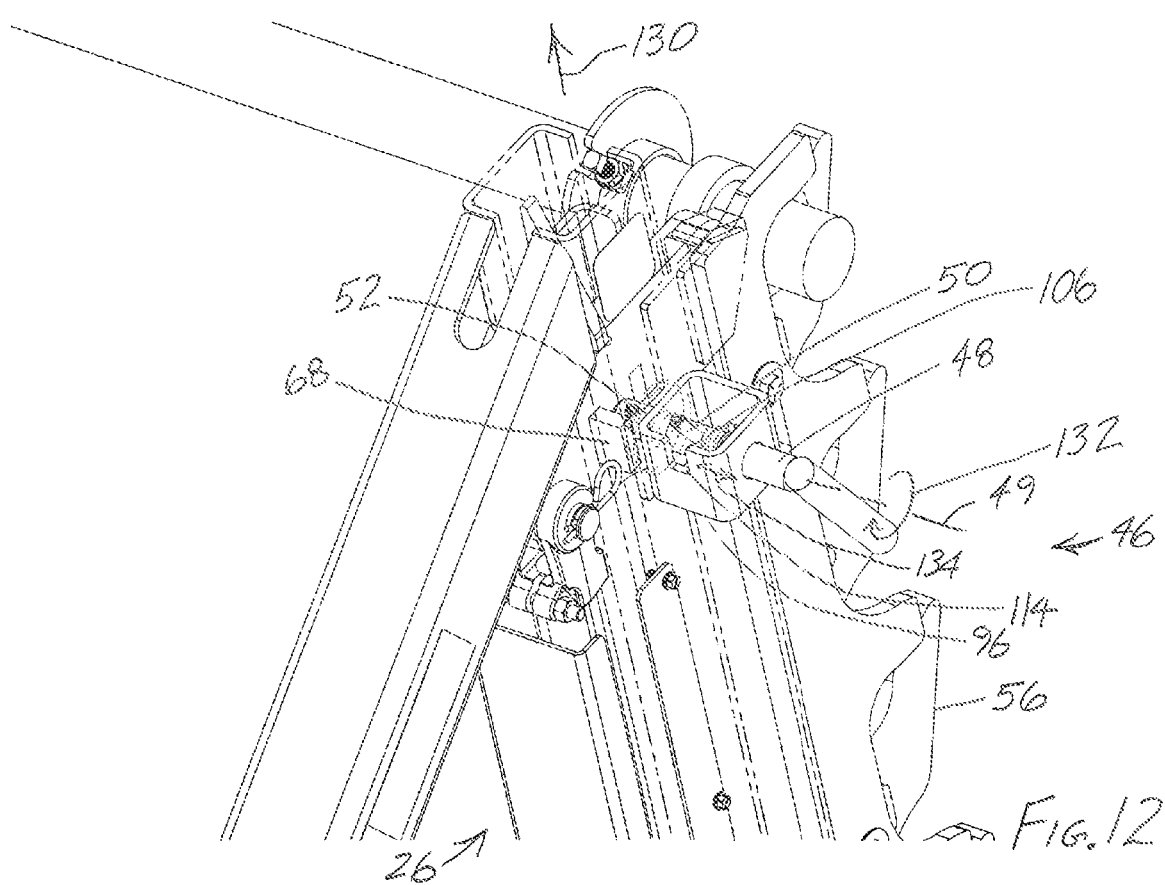

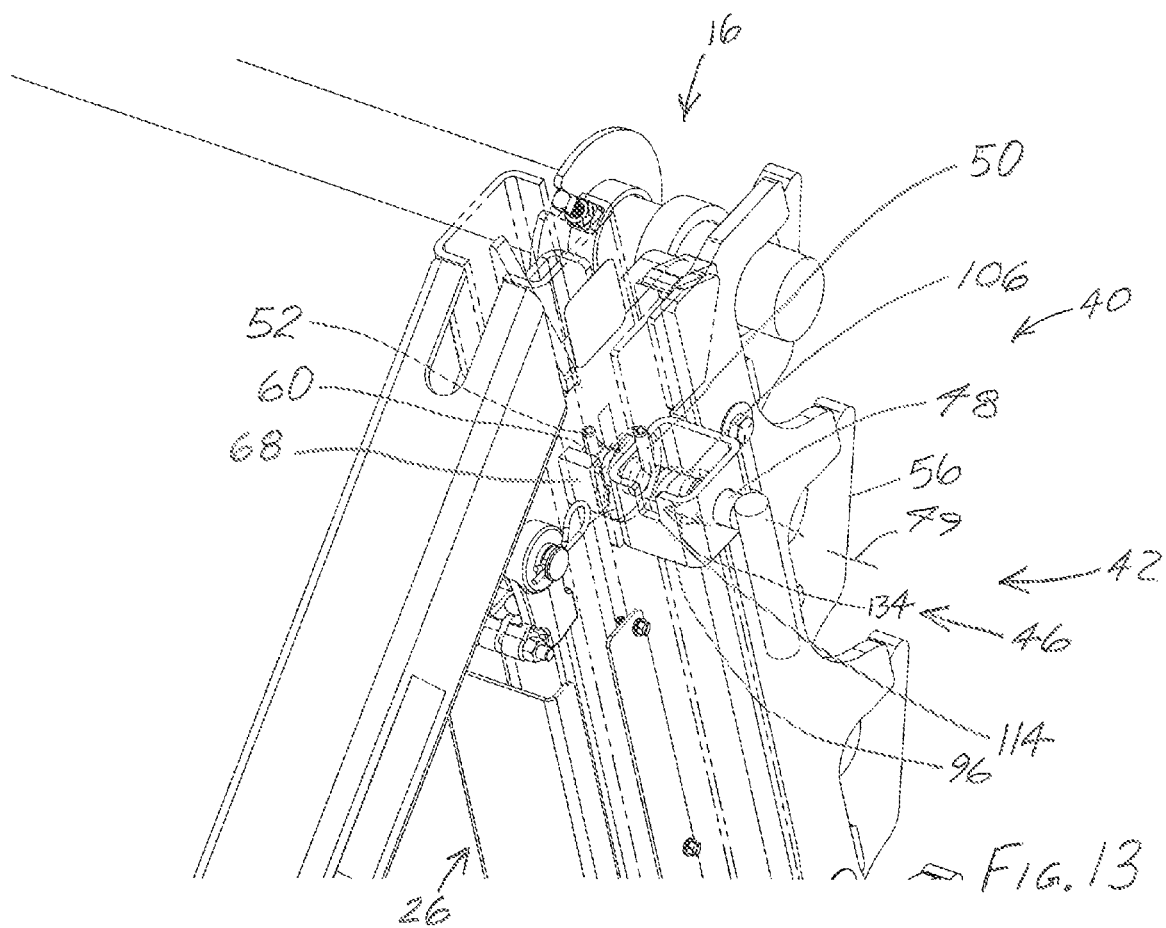

NONREMOVABLE LINKAGE

FIELD OF THE INVENTION

The present invention is directed to nonremovable linkages for use with vehicles or trailers pulled behind a vehicle.

BACKGROUND OF THE INVENTION

Vehicles or trailers pulled behind vehicles often utilize frames that support rack assemblies adapted to hold any number of things, such as cable reels, with the frames having power sources for vertically raising/lowering the cable reels as needed by the operator. For many reasons, notably for safety, the rack assembly supporting the cable reels needs to be secured to the frame while the vehicle or trailer is traveling. Typically, pins, such as quick release pins are either secured to the frame by lanyards, if they are secured at all. Moreover, even if the power source is utilized to position the rack assembly at its "travel position," prior to traveling, operators may forget to inset the pins into the rack assembly and frame, potentially placing the operator or others at risk, for reasons including not only that the cable reels are not properly secured, but the possibility of the uninstalled pins falling from the vehicles or trailers at highway speeds, or ends of fallen pins protruding upwardly after coming to rest on or along the side of the road capable of puncturing tires or resulting in other damages/injuries to motorists/passersby.

It would be desirable in the art for a nonremovable linkage for use with vehicles or trailers pulled behind vehicles that does not suffer from these deficiencies.

SUMMARY OF THE INVENTION

In an embodiment, a nonremovable linkage includes a pair of frames, each frame for supporting a corresponding portion of a rack of a rack assembly movable between a first position and a second position, each rack portion having a protrusion extending outwardly from a surface of the rack portion. The linkage further includes a device including a shaft having an axis, a handle secured to the shaft extending away from the shaft axis, and a first protrusion and a second protrusion extending outwardly from the shaft and spaced apart from one another along the shaft axis, the shaft received by an aperture formed in the frame capturing the shaft between the handle and at least one of the first protrusion and the second protrusion, the shaft movable in the frame aperture along the shaft axis and rotatable about the shaft axis. The shaft axis and an aperture formed in the rack portion are aligned when the rack portion is in the first position, and in response to an insertion of an end of the shaft inside of the rack portion aperture, the rack portion is secured to the frame in the first position. In response to application of a sufficient force to the handle in a direction along the axis away from the rack portion aperture, the shaft disengages the rack portion aperture, permitting movement of the rack portion from the first position toward the second position, and then in response to a sufficient rotational force applied to the handle, the shaft rotates about the shaft axis until the shaft first protrusion engages a retention feature that limits movement of the shaft along the shaft axis, and the shaft second protrusion is rotated into a travel path of the rack portion protrusion, or the shaft second protrusion is rotated and further in response to the rack portion sufficiently moving away from the first position toward the second position followed by a sufficient force applied to the handle in a direction along the axis toward the rack portion aperture until the shaft first protrusion is urged into contact with the retention feature, the shaft second protrusion is urged into the travel path of the rack portion protrusion. Upon the rack portion returning to the first position from the second position, the rack portion protrusion contacts the shaft second protrusion, urging the shaft second protrusion and the shaft first protrusion to rotate about the shaft axis, the shaft first protrusion rotating out of engagement with the retention feature, permitting movement of the shaft along the shaft axis. In response to application of a sufficient force to the handle in a direction along the shaft axis toward the rack portion, and simultaneously upon the rack portion returning to the first position, the mutually aligned shaft and rack portion aperture permits insertion of the end of the shaft inside of the rack portion aperture, thereby securing the rack portion to the frame in the first position.

In another embodiment, a nonremovable linkage includes a pair of frames, each frame defining an inverted V-shape for supporting a corresponding portion of a rack assembly movable between a first position and a second position, each rack portion having a protrusion extending outwardly from a surface of the rack portion. The linkage further includes a support frame supporting the inverted V-shaped frames. The linkage further includes a device including a shaft having an axis, a handle secured to the shaft extending away from the shaft axis, and a first protrusion and a second protrusion extending outwardly from the shaft and spaced apart from one another along the shaft axis, the shaft received by an aperture formed in the inverted V-shaped frame capturing the shaft between the handle and at least one of the first protrusion and the second protrusion, the shaft movable in the inverted V-shaped frame aperture along the shaft axis and rotatable about the shaft axis. The linkage further includes a spring positioned relative to the inverted V-shaped frame and the first protrusion. In response to the spring being in a loaded condition, the spring applies a restoration force to the inverted V-shaped frame and the first protrusion for urging the shaft to move along the shaft axis toward the rack portion. The shaft axis and an aperture formed in the rack portion are aligned when the rack portion is in the first position, and in response to an insertion of an end of the shaft inside of the rack portion aperture, the rack portion is secured to the inverted V-shaped frame in the first position. In response to application of a sufficient force to the handle in a direction along the axis away from the rack portion aperture to overcome the spring restoration force, the shaft disengages the rack portion aperture, permitting movement of the rack portion from the first position toward the second position, and then in response to a sufficient rotational force applied to the handle, the shaft rotates about the shaft axis until the shaft first protrusion engages a retention feature that limits movement of the shaft along the shaft axis by the spring restoration force, and the shaft second protrusion is rotated into a travel path of the rack portion protrusion, or the shaft second protrusion is rotated into engagement with the retention feature and then further in response to the rack portion sufficiently moving away from the first position toward the second position followed by application of the restoration force until the shaft first protrusion is urged into contact with the retention feature, the shaft second protrusion is urged into the travel path of the rack portion protrusion. Upon the rack portion returning to the first position from the second position, the rack portion protrusion contacts the shaft second protrusion, urging the shaft first protrusion and the shaft second protrusion to rotate about the shaft axis, the shaft first protrusion rotating out of engagement with the retention feature, permitting the spring restoration force to urge movement of the shaft along the shaft axis until the end of the shaft contacts the surface of the rack portion. In response to the rack portion returning to the first position, the shaft and the rack portion aperture are brought into mutual alignment, and the spring restoration force urges movement of the shaft along the shaft axis until the end of the shaft is inserted inside of the rack portion aperture, thereby securing the rack portion to the inverted V-shaped frame portions in the first position.

In yet another embodiment, a trailer having a nonremovable linkage includes a pair of frames, each frame for supporting a corresponding portion of a rack assembly movable between a first position and a second position, each rack portion having a protrusion extending outwardly from a surface of the rack portion. The trailer further includes a trailer frame supporting the pair of frames. The trailer further includes a device including a shaft having an axis, a handle secured to the shaft extending away from the shaft axis, and a first protrusion and a second protrusion extending outwardly from the shaft and spaced apart from one another along the shaft axis, the shaft received by an aperture formed in the frame capturing the shaft between the handle and at least one of the first protrusion and the second protrusion, the shaft movable in the frame aperture along the shaft axis and rotatable about the shaft axis. The trailer further includes a spring positioned relative to the frame and the first protrusion. In response to the spring being in a loaded condition, the spring applies a restoration force to the frame and the first protrusion for urging the shaft to move along the shaft axis toward the rack portion. The shaft axis and an aperture formed in the rack portion are aligned when the rack portion is in the first position, and in response to an insertion of an end of the shaft inside the rack portion aperture, the rack portion is secured to the frame in the first position. In response to application of a sufficient force to the handle in a direction along the axis away from the rack portion aperture to overcome the spring restoration force, the shaft disengages the rack portion aperture, permitting movement of the rack portion from the first position toward the second position, and then in response to a sufficient rotational force applied to the handle, the shaft rotates about the shaft axis until the shaft first protrusion engages a retention feature that limits movement of the shaft along the shaft axis by the spring restoration force, and the shaft second protrusion is rotated into a travel path of the rack portion protrusion, or the shaft second protrusion is rotated into engagement with the retention feature and then further in response to the rack portion sufficiently moving away from the first position toward the second position followed by application of the spring restoration force until the shaft first protrusion is urged into contact with the retention feature, the shaft second protrusion is urged into the travel path of the rack portion protrusion. Upon the rack portion returning to the first position from the second position, the rack portion protrusion contacts the shaft second protrusion, urging the shaft second protrusion and the shaft first protrusion to rotate about the shaft axis, the shaft first protrusion rotating out of engagement with the retention feature, permitting the spring restoration force to urge movement of the shaft along the shaft axis until the end of the shaft contacts the surface of the rack portion. In response to the rack portion returning to the first position, the shaft and the rack portion aperture are brought into mutual alignment, and the spring restoration force urges movement of the shaft along the shaft axis until the end of the shaft is inserted inside of the rack portion aperture, thereby securing the rack portion to the frame in the first position.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIGS. 8-13 are sequential views showing the operation of the nonremovable linkage of the trailer of FIG. 7.

FIG. 14 is an upper perspective view of an exemplary protrusion extending from a surface of a rack member.

FIG. 15 is an upper perspective view showing an exemplary travel path of an exemplary protrusion from a surface of a rack member.

Wherever possible, the same reference numbers will be used throughout the drawings to represent the same parts.

DETAILED DESCRIPTION OF THE INVENTION

Figure 1:
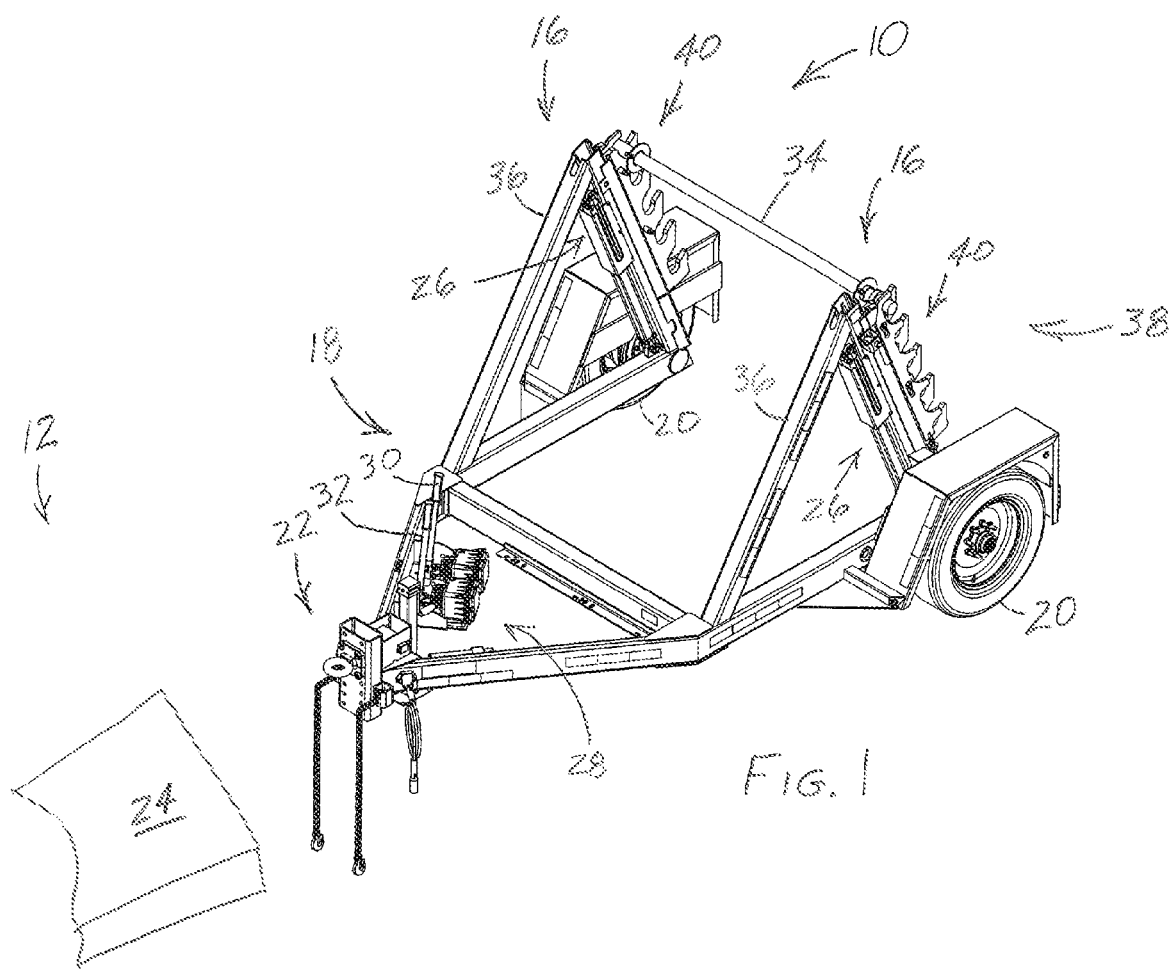
FIG. 1 is an upper perspective view of an exemplary trailer or vehicle.
Figure 2:
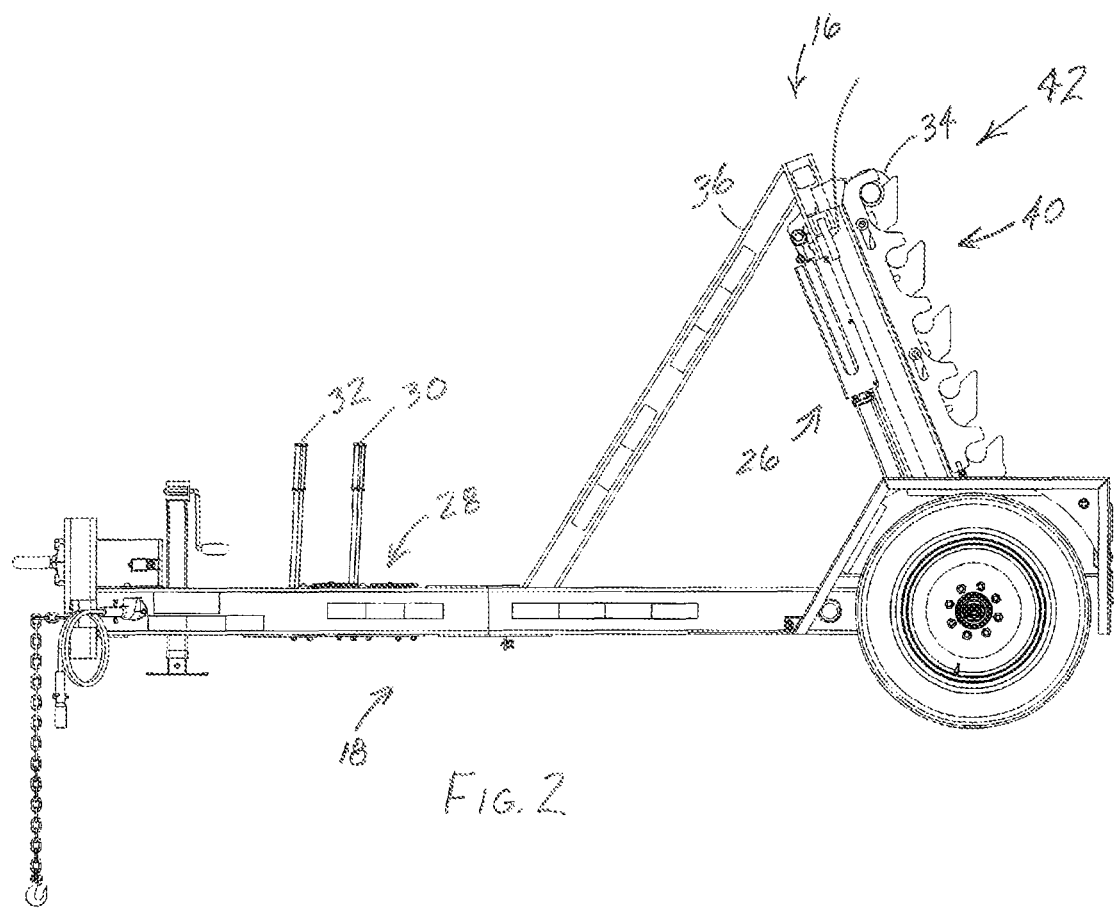
FIG. 2 is a side elevation view of the trailer of FIG. 1 in a travel position.
Figure 3:
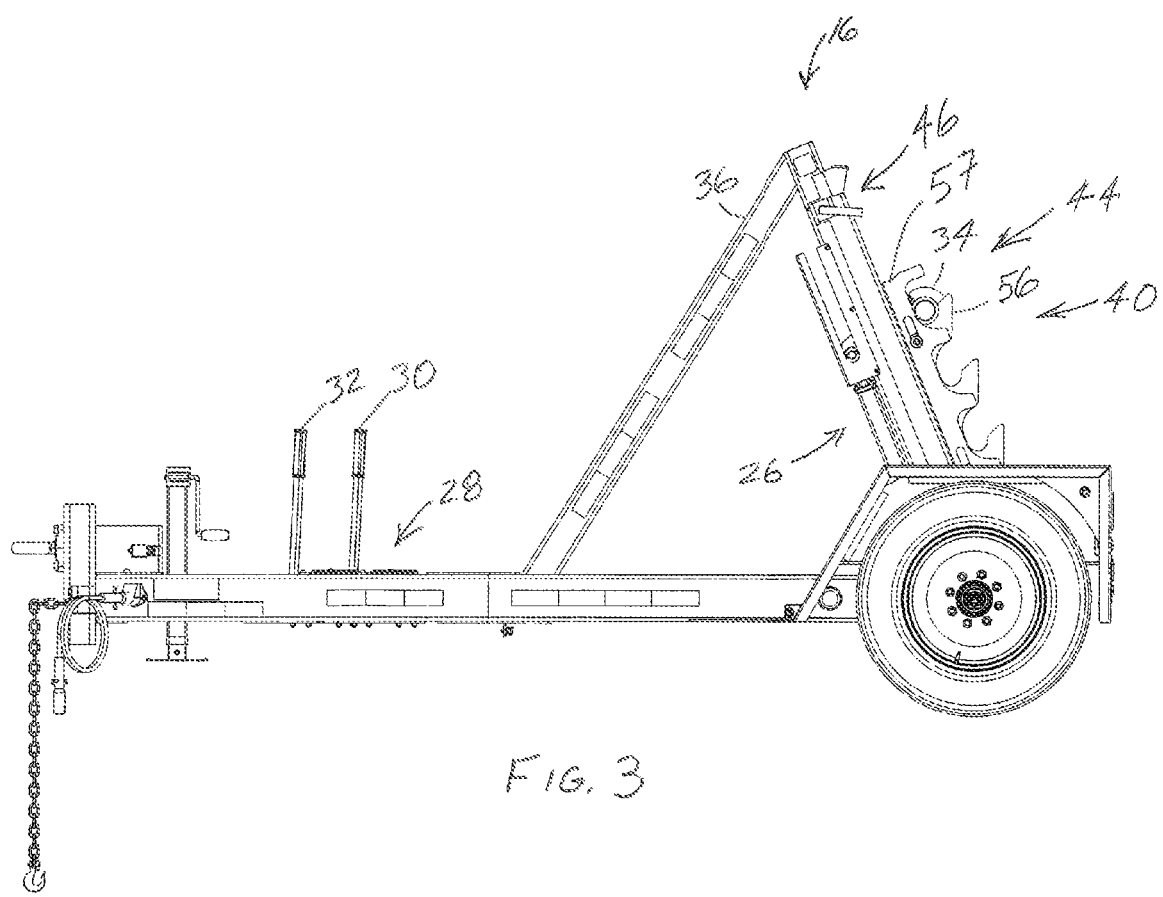
FIG. 3 is a side elevation view of the trailer of FIG. 1 in a work position.
Figure 4:
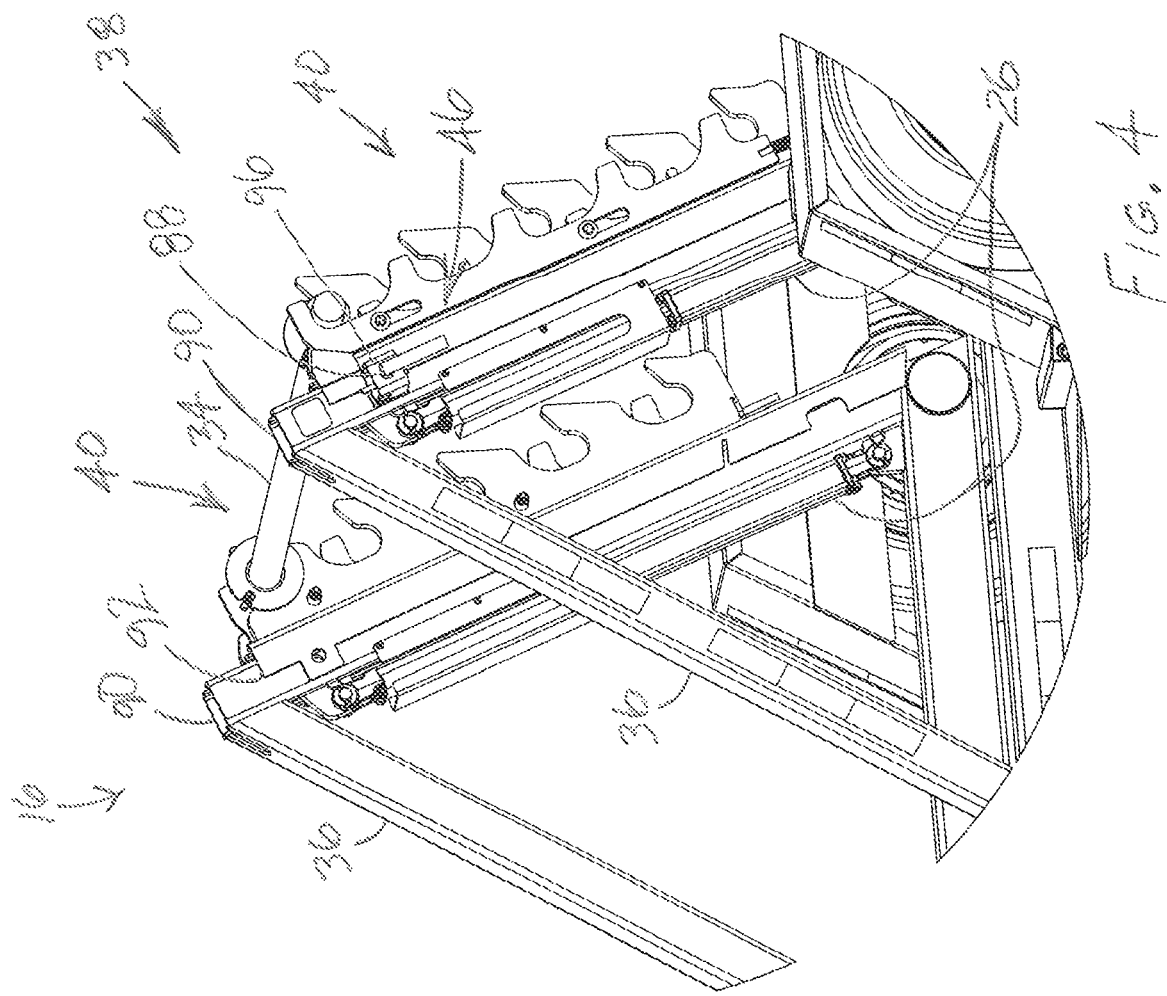
FIG. 4 is an enlarged partial upper perspective view of the trailer of FIG. 1 in the travel position.

The present disclosure is directed to FIGS. 1-13, and more specifically, an exemplary trailer 10 is shown in FIG. 1 for transporting articles such as reels of cable for power transmission or other uses. As shown, trailer 10 includes a pair of frames 16 such as arranged to define a pair of inverted V-shaped frames movably supporting a rack assembly 38 between a travel position 42 and a lowered position 44 (FIG. 3) utilized to more easily access the article, permitting work to be performed while the trailer is not moving. Trailer 10 includes a trailer frame 18 for supporting frames 16, wheels 20 rotatably connected to trailer frame 18, and a hitch 22 permitting the trailer to be pulled behind a vehicle 12. Optionally, frames 16 may be supported by a support frame 24 of vehicle 12, and not requiring a pull-behind trailer arrangement. Rack assembly 38 includes a pair of opposed rack portions 40 supporting opposed ends of a roller 34 for carrying articles such as cable reels or other hollow cylindrically shaped articles or suitably configured articles. As shown, levers 30, 32 are operably connected to a power source 28, such as pressurized fluid for actuating or moving a pair of actuators 26 between positions 42 (FIG. 2) and 44 (FIG. 3). Alternately, power source 28 may be provided by an electrical motor, a mechanical motor, a mechanical linkage, or combination thereof.

Figure 5:
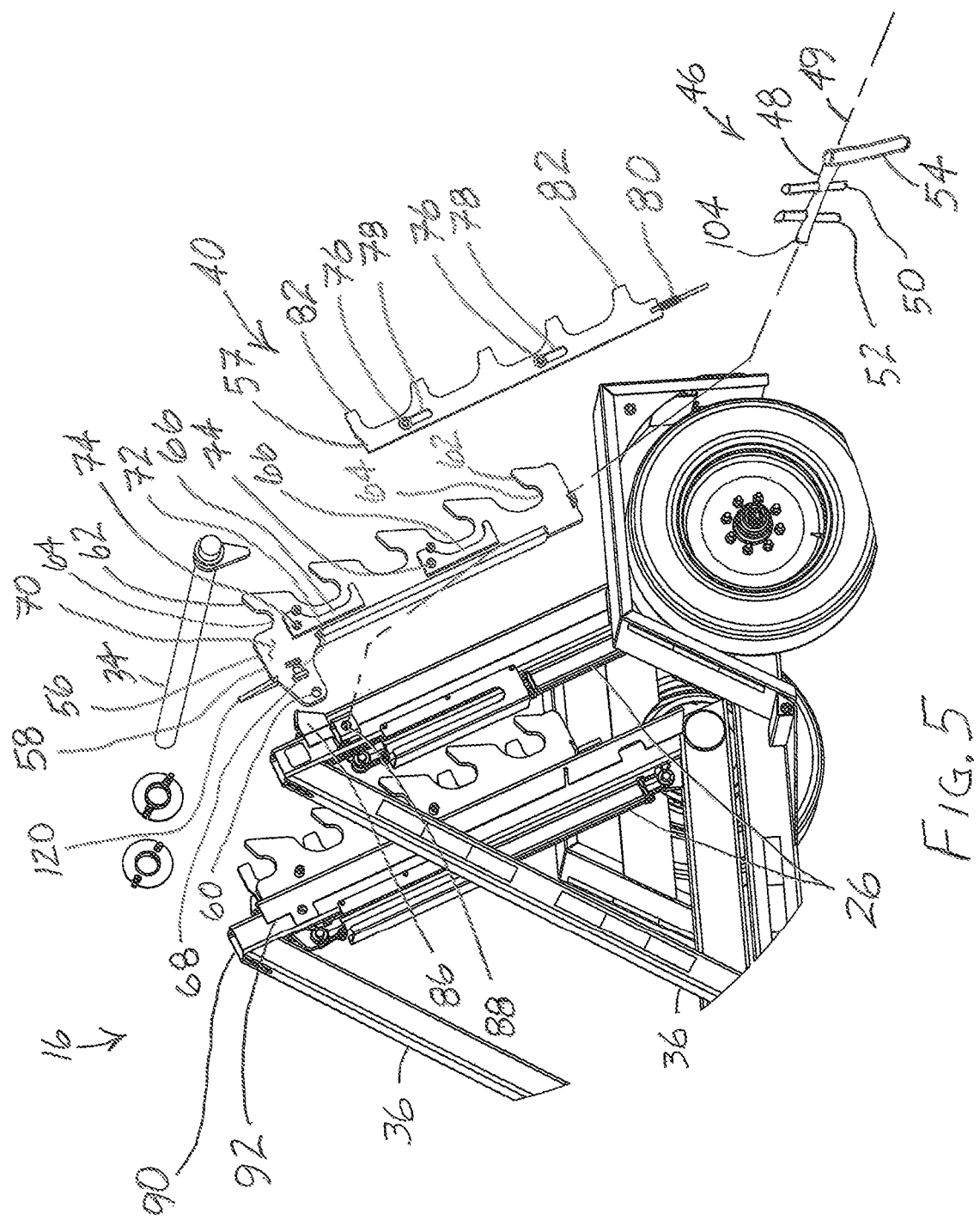
FIG. 5 is a partially exploded view of the trailer of FIG. 4.
Figure 6:
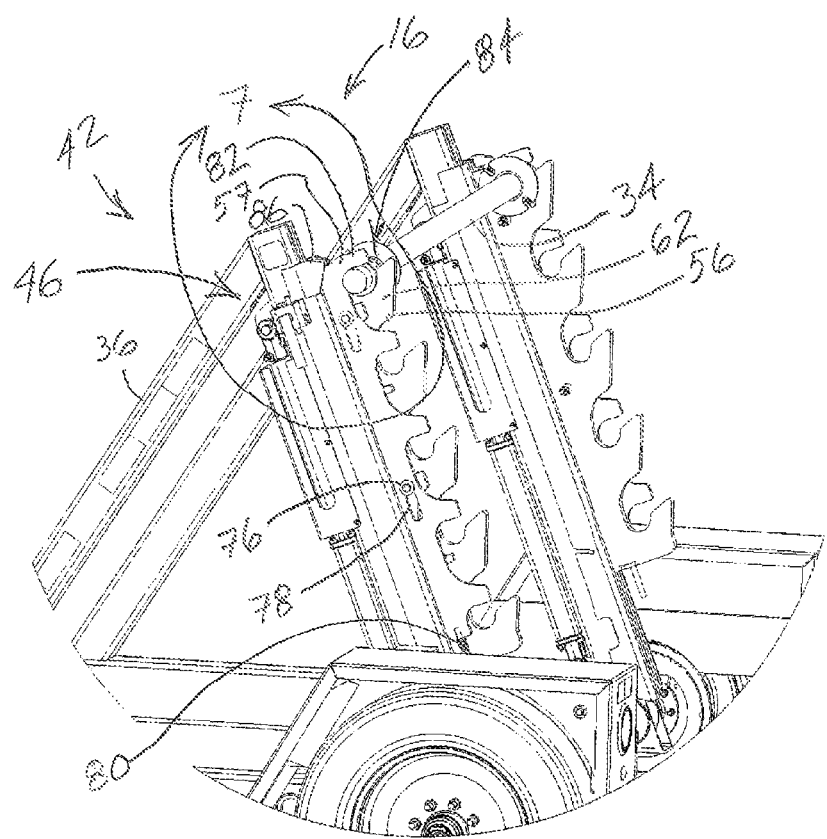
FIG. 6 is an enlarged partial upper perspective view of the trailer of FIG. 4 in the travel position partially rotated about a vertical axis.
Figure 7:
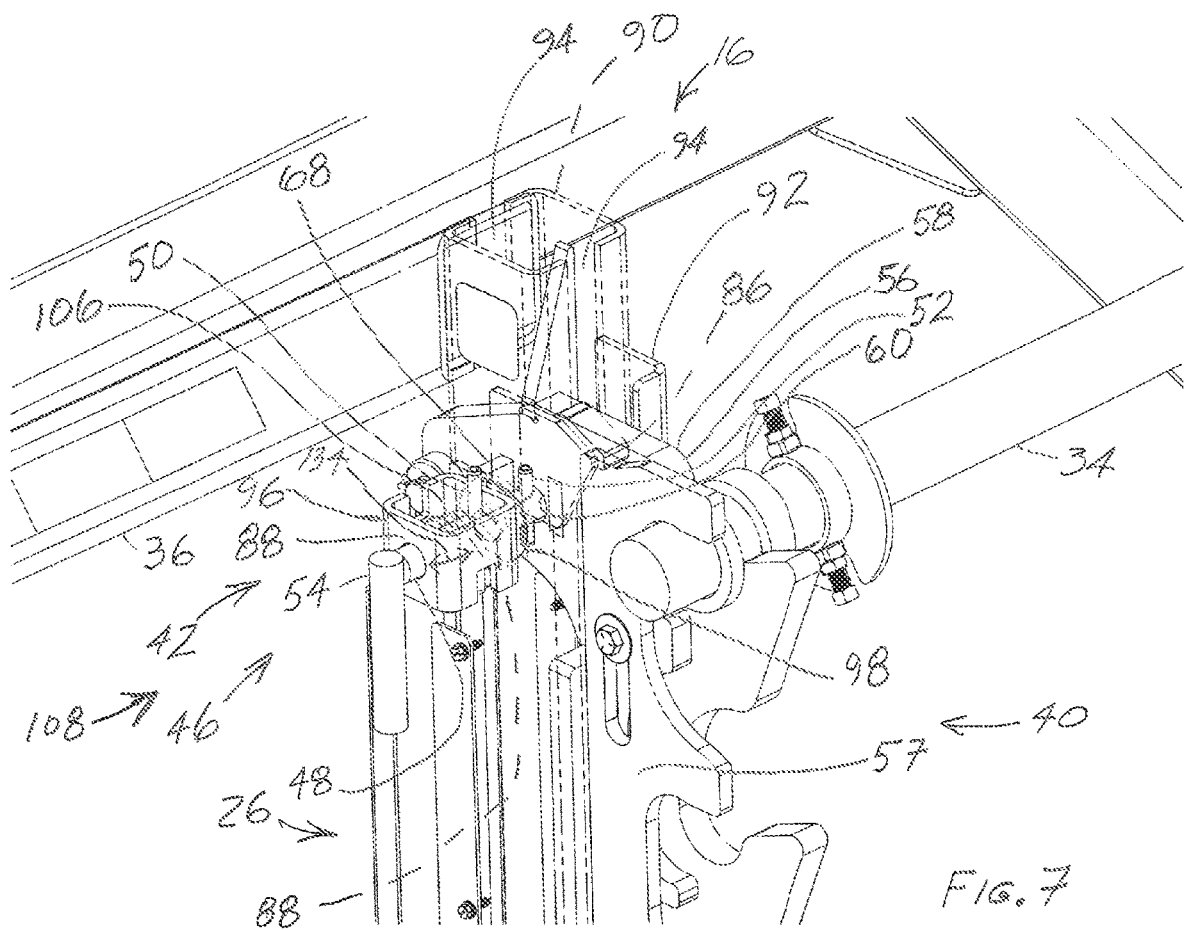
FIG. 7 is an enlarged partial upper perspective view of a nonremovable linkage of the trailer taken from region 7 of FIG. 6.

FIG. 5 shows a partially exploded view of rack portion 40 and FIG. 7 shows an enlarged partial view of rack portion 40 and associated components taken from region 7 of FIG. 6.

As further shown in FIG. 5, rack portion 40 includes a rack member 56 having an elongate head 58 having an aperture 60 for receiving an end of actuator 26, which rack member 56 including a plurality of hooks 62 having corresponding recesses 64 positioned at the base of each hook 62. As shown, head 58 of rack member 56 further includes a protrusion 68 such as a generally rectangular block extending outwardly from a surface 70 of rack member 56, and an aperture 72 formed near protrusion 68. A pair of spacers 66 slidably separate rack member 56 from a rack member 57, each spacer 66 having a threaded aperture 74 for threadedly receiving a fastener 76 therein, the relative sliding movement between rack members 56, 57 limited by the opposed ends of slots 78. A spring 80 urges retainers 82 of rack member 57 toward their corresponding hooks 62, the corresponding retainers 82 and hooks 62 forming pockets 84 (FIG. 6) for receiving a corresponding end of roller 34 (FIG. 5). A stop 86 secured to frame 16 abuts the top of rack member 57 when rack portion 40 is at travel position 42, ensuring that corresponding hooks 62 and retainers 82 of respective rack members 56, 57 are secured relative to one another.

As further shown in FIG. 5, a device 46 includes a shaft 48 having an axis 49, a handle 54 secured to the shaft 48 extending away from axis 49 at an angle such as 90 degrees, and a first protrusion 50 and a second protrusion 52 extending outwardly from shaft 48 and spaced apart from one another along axis 49. Shaft 48 is received by an aperture 88 formed in frame 16 capturing shaft 48 between handle 54 and at least one of protrusion 50 and protrusion 52 (FIG. 7 shows a pair of apertures 88 each receiving shaft 48), with shaft 48 movable in frame aperture 88 along axis 49 and rotatable about axis 49. In addition, as a result of the novel nonremovable linkage provided by specially configured device 46 in combination with protrusion 68 formed in rack member 56 that is supported by frame 16, enhanced safety is achieved. In one embodiment, protrusions 50, 52 are in mutual alignment along shaft 48. In one embodiment, protrusions 50, 52 are pins. In one embodiment, protrusions 50, 52 are spring pins.

For purposes herein, the term "nonremovable" is intended to mean that the arrangement/device required to selectively secure a movable rack assembly to a frame would not include a "loose" arrangement/device such as a quick release pin or similarly configured pin, but which arrangement/device would be captured by the frame and continuously engaged directly in the frame at all times (i.e., both when the arrangement/device is "active" (being used to secure the rack assembly to a frame) as well as "inactive" (when the arrangement/device is not being used to secure the rack assembly to a frame)) and requiring a tool to disassemble the arrangement/device in order to disengage the arrangement/device from the frame, such as removing both protrusions 50, 52 from shaft 48.

For purposes herein, the term "loose" as in "loose pin" is intended to mean the pin is secured to one end of a lanyard, with the other end of the lanyard attached to a frame, that the pin is selectively engaged to a clip secured to the frame when the pin is not inserted for securing the rack assembly to the frame, or that the pin is fully disconnected or disengaged from the frame when the pin is not inserted for securing the rack assembly to the frame.

As shown in FIG. 7, frame 16 defines an inverted V-shaped frame comprising frame member 36 corresponding to one leg of the inverted V-shaped frame that is secured at mutual ends to frame members 90, 92 that are secured together to form the other leg of the V-shaped frame. Frame 16 further includes a guard 96 (also see FIGS. 4, 5) secured to frame member 90. Frame member 90 includes a pair of aligned slots 94 for slidably receiving head 58 of rack member 56 as actuated or moved by actuator 26 (FIG. 3) between travel position 42 and lowered position 44 (FIG. 3). FIG. 7 shows shaft 48 of device 46 in a fully installed position 108 in frame 16, with shaft 48 of device 46 extending through aligned apertures 88 formed in guard 96, an aperture 98 formed in frame member 90, through an open space inside of frame member 90, and an end 104 (FIG. 5) of device 46 extends inside of an aperture 72 (also see FIG. 5) of rack member 56 of rack portion 40. In this fully installed position, rack portion 40 is secured to frame 16 in travel position. As further shown in FIG. 7, protrusion 50 is positioned within guard 96 and protrusion 52 is positioned within the open space inside of frame member 90. Optionally, a spring 106 is positioned surrounding a portion of shaft 48 between a wall of guard 96 and protrusion 50 and placed under load (i.e., compressed) to provide a restoration force 134 for urging shaft 48 toward fully installed position 108. Different spring arrangements that may be positioned differently are contemplated by the invention.

FIGS. 7-13 are sequential views showing the operation of the nonremovable linkage of the trailer between subsequent fully installed positions 108. Stated another way, these operational sequences show how the nonremovable linkage transitions from fully installed position 108 in which frame 16 secures each rack portion 40 of rack assembly (FIG. 1) in transport position 42, then to an unsecured position permitting the rack assembly to be lowered such as to lowered position 44 (FIG. 3), before returning the rack assembly to the travel position 42 (FIG. 13), and then locking or securing the rack assembly in the transport position, or fully installed position 108 of device 46 (FIG. 13). Each of the rack portions 40 are simultaneously subjected to the same operations, and thus, only one side is shown and discussed.

Figure 8:
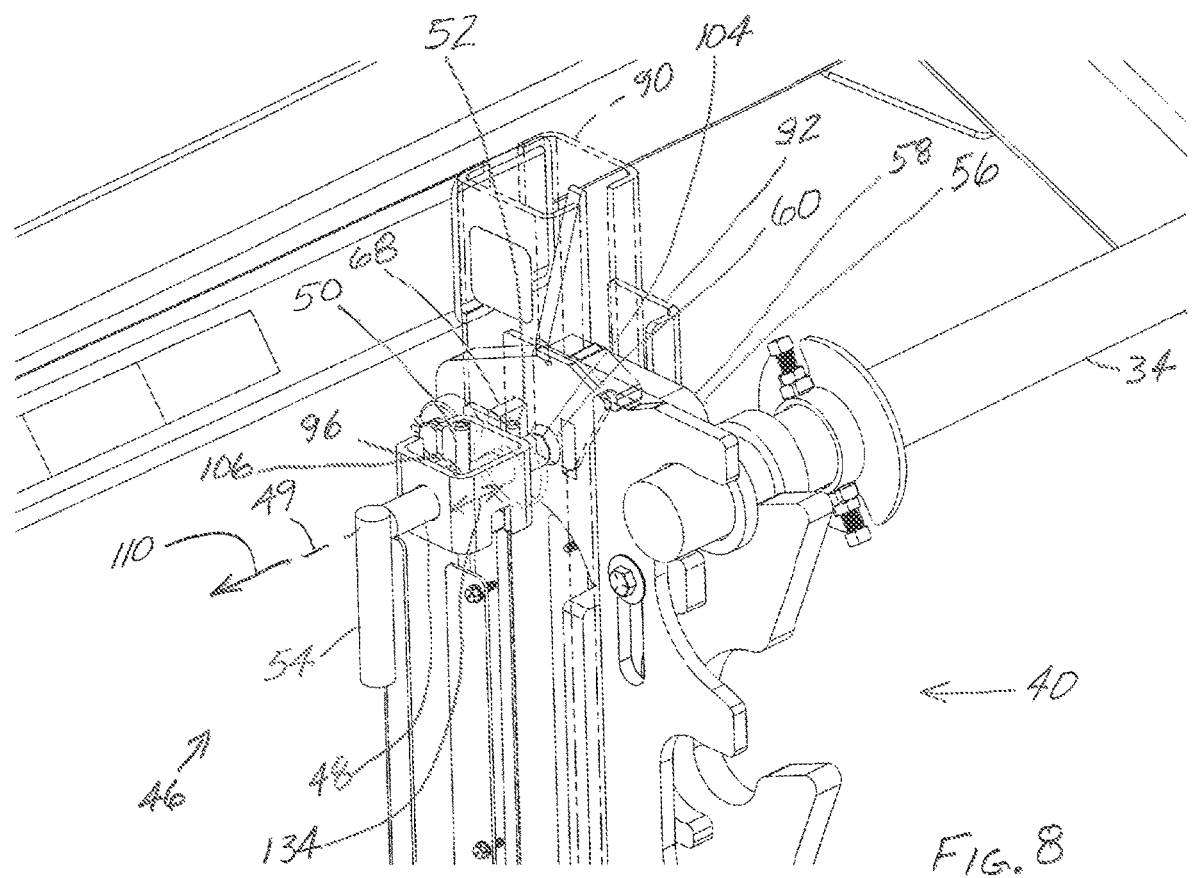

As shown in FIG. 8, a sufficient force 110 is applied to handle 54 parallel to shaft axis 49 (FIG. 5) in a direction away from aperture 72 of rack member 56 of rack portion 40 to overcome restoration force 134 of spring 106 (and frictional forces between contacting surfaces) and urging shaft 48 to move along axis until end 104 of shaft 48 disengages rack portion aperture 72 of rack member 56 and protrusion 52 moves past protrusion 68 of rack member 56. In one embodiment, shaft 48 is urged to move along axis until end 104 of shaft 48 disengages rack portion aperture 72 of rack member 56, but protrusion 52 does not entirely move past protrusion 68 of rack member 56. Once end 104 of shaft 48 disengages rack portion aperture 72 of rack member 56, rack member 56 is no longer secured by shaft 48, rack member 56 may be moved from travel position 42 (FIG. 7) toward lowered position 44 (FIG. 3), although in this position, facilitating such movement of rack member 56 would require multiple operators, but if performed, the sequence involving rotational force 112 as shown in FIG. 9 would not be required, and the operational sequence could resume at FIG. 11, except that ramp 120 would contact end 104 of shaft 48 urging end 104 along surface 70 of rack member 56 until there is mutual alignment between end 104 of shaft 48 and aperture 72, wherein application of restoration force 134 (FIG. 13) urges end 104 of shaft 48 inside of aperture 72, thereby securing rack member 56 to frame 16.

As shown in FIG. 9, once end 104 of shaft 48 disengages rack portion aperture 72 of rack member 56 and protrusion 52 moves past protrusion 68 of rack member 56 in a direction along axis 49, while temporarily maintaining force 110 (FIG. 8), a sufficient rotational force 112 is applied to the handle 54, urging shaft 48 to rotate about shaft axis 49 until shaft protrusion 50 engages a retention feature 114 such as a recess (shown as a pair of recesses 114 in FIG. 9 that engages opposed protrusions 50) that limits movement of shaft 48 along shaft axis 49 to that corresponding to a distance as measured along axis 49 between the opposed edges of retention feature 114, and simultaneously shaft protrusion 52 is rotated about axis 49 to a position adjacent to a vertical surface 116 of protrusion 68 of rack member 56. Upon discontinuance of forces 110 (FIG. 8) and 112, spring 106 applies restoration force 134 between guard 96 and protrusion 50, urging shaft 48 to move along axis 49 toward the rack portion aperture 72 until protrusion 52 contacts or engages surface 116 of protrusion 68 of rack member 56, with end 104 remaining disengaged from rack portion aperture 72, permitting rack member 56 to move away (i.e., vertically downwardly) from travel position 42 toward lowered position 44 (FIG. 3).

As shown in FIG. 10, after rack member 56 been partially moved away (i.e., vertically downwardly) from travel position 42 (FIG. 9) to an intermediate position 122, surface 116 of protrusion 68 of rack member 56 has moved out of contact or engagement with protrusion 52, spring 106 continues to apply restoration force 134 along axis 49 between guard 96 and protrusion 50 toward rack member 56, urging protrusion 50 into contact with retention feature 114, and simultaneously urging end 104 of shaft 48 toward ramp 120 (FIG. 5) extending from rack member 56. Once surface 116 of protrusion 68 of rack member 56 has moved out of contact or engagement with protrusion 52, by virtue of restoration force 134 of spring 106 further urging shaft 48 along axis 49, protrusion 52 is similarly urged along axis 49 and into a travel path 124 (FIG. 15) of protrusion 68 of rack member 56 upon the return of rack member 56 to travel position 42. That is, travel path 124 (FIG. 15) defines a volume having a surface area defined by a perimeter 126 (FIG. 15) corresponding to protrusion 68 of rack member 56 that is multiplied by the distance traveled by protrusion 68 between travel position 42 (FIG. 2) and lowered position 44 (FIG. 3).

In other embodiments, protrusion 68 may have different geometries. For example, as shown in FIG. 14, protrusion 68 includes a shoulder 118, corresponding to a removal of material from a solid rectangular version of protrusion 68 (see e.g., FIG. 15). As a result of shoulder 118, or a similar geometry that presents a surface 128 that is offset from surface 116 and positioned within travel path 124 (FIG. 15) as previously discussed, when protrusion 52 (FIG. 9) is positioned in contact with or in close proximity to surface 128 after application of force 110 (FIG. 8) followed by application of rotational force 112 (FIG. 9), protrusion 52 (FIG. 9) may be directly positioned in travel path 124 (FIG. 15). That is, although FIG. 8 shows force 110 (FIG. 8) disengaging end 104 of shaft 48 from rack portion aperture 72 of rack member 56, protrusion 52 would not need to totally move past protrusion 68 (i.e., past surface 116) of rack member 56 in a direction along axis 49, but only past surface 128 of protrusion 68. Then, while temporarily maintaining force 110 (FIG. 8), as shown in FIG. 9, rotational force 112 is applied to handle 54 as before, urging shaft 48 to rotate about shaft axis 49 until shaft protrusion 50 engages a retention feature 114. However, utilizing the embodiment of protrusion 68 (FIG. 14), shaft protrusion 52 is rotated about axis 49 to a position adjacent to a vertical surface 128 (not surface 116) of protrusion 68 of rack member 56. Upon discontinuance of forces 110 (FIG. 8) and 112, spring 106 applies restoration force 134 between guard 96 and protrusion 50, urging shaft 48 to move along axis 49 toward the rack portion aperture 72 until protrusion 52 contacts or engages or is brought into close proximity with surface 128 of protrusion 68 of rack member 56, with end 104 remaining disengaged from rack portion aperture 72, permitting rack member 56 to move away (i.e., vertically downwardly) from travel position 42 toward lowered position 44 (FIG. 3). As a result, protrusion 52 is in travel path 124 (FIG. 15) of protrusion 68 of rack member 56 after discontinuance of rotational force 112 and while rack member is still in travel position 42 (i.e., prior to rack member 56 moving toward travel position 44 (FIG. 2)).

Once protrusion 52 (FIG. 10) is in travel path 124 (FIG. 15) of protrusion 68 (FIG. 10), and the work associated with moving rack member 56 (FIG. 10) to lowered position 44 (FIG. 2) has been completed, as shown in FIG. 11, actuator 26 urges rack member 56 in direction 130 toward travel position 42 (FIG. 13). As further shown in FIG. 11, as rack member 56 nears travel position 42 (FIG. 13), protrusion 68 of rack member 56 contacts protrusion 52, urging protrusions 50, 52 into rotational movement 132 about axis 49. As shown in FIG. 12, in response to continued rotational movement 132 of device 46, protrusion 50 rotates out of engagement with retention feature 114, permitting spring 106 to apply restoration force 134 for urging movement of shaft 48 along axis 49. In response to a continuous application of restoration force 134, and simultaneously upon rack member 56 returning to first position 42, as shown in FIG. 13, the mutually aligned shaft 48 and aperture 72 of rack member 56 permits insertion of end 134 (FIG. 5) of shaft 48 inside of aperture 72 as previously discussed, thereby securing rack member 56 of rack portion 40 to frame 16 in travel position 42.

One having ordinary skill in the art can appreciate that when spring 106 (FIG. 8) is utilized, once the corresponding rack members 56 (FIG. 8) of rack assembly 38 (FIG. 1) are actuated by actuators 26 (FIG. 1) to return from lowered position 44 (FIG. 3) to the travel position 42 (FIG. 2), the nonremovable linkage automatically secures the rack assembly to the frame 16 (FIG. 1). That is, once the corresponding apertures 72 (FIG. 8) of each respective rack member 56 (FIG. 8) are brought into mutual alignment with its corresponding shaft 48 (FIG. 8) of device 46 (FIG. 8), restoration force 134 (FIG. 8) of spring 106 (FIG. 8) urges shaft 48 into engagement inside of the corresponding apertures 72 for securing the rack assembly to the frame 16 (FIG. 1) without operator assistance, thereby resulting in enhanced safety for the operator and others.

One having ordinary skill in the art can appreciate that spring 106 (FIG. 8) is not required, and that an operator can apply forces to the handle of device 46 (FIG. 8) along axis 49 (FIG. 8) for securing the rack assembly to the frame 16 (FIG. 1), instead of utilizing the restoration force of the spring.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A nonremovable linkage for use with a support frame of a vehicle, comprising:
    a pair of frames, each frame for supporting a corresponding portion of a rack of a rack assembly movable between a first position and a second position, each rack portion having a protrusion extending outwardly from a surface of the rack portion; and
    a device including a shaft having an axis, a handle secured to the shaft extending away from the shaft axis, and a first protrusion and a second protrusion extending outwardly from the shaft and spaced apart from one another along the shaft axis, the shaft received by an aperture formed in the frame capturing the shaft between the handle and the first protrusion, the shaft movable in the frame aperture along the shaft axis and rotatable about the shaft axis;
    wherein the shaft axis and an aperture formed in the rack portion are aligned when the rack portion is in the first position, and in response to an insertion of an end of the shaft inside of the rack portion aperture, the rack portion is secured to the frame in the first position;
    wherein in response to application of a sufficient force to the handle in a direction along the axis away from the rack portion aperture, an end portion of the shaft disengages the rack portion aperture, permitting movement of the rack portion from the first position toward the second position, and then in response to a sufficient rotational force applied to the handle, the shaft rotates about the shaft axis until the shaft first protrusion engages a retention feature that limits movement of the shaft along the shaft axis, and the shaft second protrusion is rotated into a travel path of the rack portion protrusion, or the shaft second protrusion is rotated and further in response to the rack portion sufficiently moving away from the first position toward the second position followed by a spring restoration force applied to the handle in a direction along the axis toward the rack portion aperture until the shaft first protrusion is urged into contact with the retention feature, the shaft second protrusion is urged into the travel path of the rack portion protrusion;
    wherein upon the rack portion returning to the first position from the second position, the rack portion protrusion contacts the shaft second protrusion, urging the shaft second protrusion and the shaft first protrusion to rotate about the shaft axis, the shaft first protrusion rotating out of engagement with the retention feature, permitting movement of the shaft along the shaft axis; and
    wherein in response to application of the spring restoration force to the handle in a direction along the shaft axis toward the rack portion, and simultaneously upon the rack portion returning to the first position, the mutually aligned shaft and rack portion aperture permits insertion of the end of the shaft inside of the rack portion aperture, thereby securing the rack portion to the frame in the first position.

2. The nonremovable linkage of claim 1, wherein the first protrusion and the second protrusion are mutually aligned along the shaft axis.

3. The nonremovable linkage of claim 1, wherein the first protrusion and the second protrusion are pins.

4. The nonremovable linkage of claim 1 further comprises a spring positioned relative to the frame and the first protrusion, wherein in response to the spring being in a loaded condition, the spring applies the restoration force to the frame and the first protrusion for urging the shaft to move along the shaft axis toward the rack portion.

5. The nonremovable linkage of claim 1 further comprises a power source for moving each rack portion of the rack assembly between the first position and the second position.

6. The nonremovable linkage of claim 5, wherein the power source is taken from a group comprising at least one of a pressurized fluid, an electrical motor, a mechanical motor, or a mechanical linkage.

7. The nonremovable linkage of claim 1, wherein the retention feature is a recess formed in the frame.

8. The nonremovable linkage of claim 1, wherein the pair of frames is configured to be supported by the support frame pulled by the vehicle.

9. The nonremovable linkage of claim 1, wherein each frame defines an inverted V-shape.

10. A nonremovable linkage comprising:
    a pair of frames, each frame defining an inverted V-shape for supporting a corresponding portion of a rack assembly movable between a first position and a second position, each rack portion having a protrusion extending outwardly from a surface of the rack portion;
    a support frame supporting the inverted V-shaped frames;
    a device including a shaft having an axis, a handle secured to the shaft extending away from the shaft axis, and a first protrusion and a second protrusion extending outwardly from the shaft and spaced apart from one another along the shaft axis, the shaft received by an aperture formed in the inverted V-shaped frame capturing the shaft between the handle and the first protrusion, the shaft movable in the inverted V-shaped frame aperture along the shaft axis and rotatable about the shaft axis;
    a spring positioned relative to the inverted V-shaped frame and the first protrusion, wherein in response to the spring being in a loaded condition, the spring applies a restoration force to the inverted V-shaped frame and the first protrusion for urging the shaft to move along the shaft axis toward the rack portion;
    wherein the shaft axis and an aperture formed in the rack portion are aligned when the rack portion is in the first position, and in response to an insertion of an end of the shaft inside of the rack portion aperture, the rack portion is secured to the inverted V-shaped frame in the first position;
    wherein in response to application of a sufficient force to the handle in a direction along the axis away from the rack portion aperture to overcome the spring restoration force, the shaft disengages the rack portion aperture, permitting movement of the rack portion from the first position toward the second position, and then in response to a sufficient rotational force applied to the handle, the shaft rotates about the shaft axis until the shaft first protrusion engages a retention feature that limits movement of the shaft along the shaft axis by the spring restoration force, and the shaft second protrusion is rotated into a travel path of the rack portion protrusion, or the shaft second protrusion is rotated into engagement with the retention feature and then further in response to the rack portion sufficiently moving away from the first position toward the second position followed by application of the restoration force until the shaft first protrusion is urged into contact with the retention feature, the shaft second protrusion is urged into the travel path of the rack portion protrusion;

wherein upon the rack portion returning to the first position from the second position, the rack portion protrusion contacts the shaft second protrusion, urging the shaft first protrusion and the shaft second protrusion to rotate about the shaft axis, the shaft first protrusion rotating out of engagement with the retention feature, permitting the spring restoration force to urge movement of the shaft along the shaft axis until the end of the shaft contacts the surface of the rack portion;

wherein in response to the rack portion returning to the first position, the shaft and the rack portion aperture are brought into mutual alignment, and the spring restoration force urges movement of the shaft along the shaft axis until the end of the shaft is inserted inside of the rack portion aperture, thereby securing the rack portion to the inverted V-shaped frame portions in the first position.

11. The nonremovable linkage of claim 10, wherein the first protrusion and the second protrusion are mutually aligned along the shaft axis.

12. The nonremovable linkage of claim 10, wherein the first protrusion and the second protrusion are pins.

13. The nonremovable linkage of claim 12 further comprises a power source for moving each rack portion of the rack assembly between the first position and the second position.

14. A trailer having a nonremovable linkage comprising:
a pair of frames, each frame for supporting a corresponding portion of a rack assembly movable between a first position and a second position, each rack portion having a protrusion extending outwardly from a surface of the rack portion;
a trailer frame supporting the pair of frames;
a device including a shaft having an axis, a handle secured to the shaft extending away from the shaft axis, and a first protrusion and a second protrusion extending outwardly from the shaft and spaced apart from one another along the shaft axis, the shaft received by an aperture formed in the frame capturing the shaft between the handle and the first protrusion, the shaft movable in the frame aperture along the shaft axis and rotatable about the shaft axis;
a spring positioned relative to the frame and the first protrusion, wherein in response to the spring being in a loaded condition, the spring applies a restoration force to the frame and the first protrusion for urging the shaft to move along the shaft axis toward the rack portion;

wherein the shaft axis and an aperture formed in the rack portion are aligned when the rack portion is in the first position, and in response to an insertion of an end of the shaft inside the rack portion aperture, the rack portion is secured to the frame in the first position;

wherein in response to application of a sufficient force to the handle in a direction along the axis away from the rack portion aperture to overcome the spring restoration force, the shaft disengages the rack portion aperture, permitting movement of the rack portion from the first position toward the second position, and then in response to a sufficient rotational force applied to the handle, the shaft rotates about the shaft axis until the shaft first protrusion engages a retention feature that limits movement of the shaft along the shaft axis by the spring restoration force, and the shaft second protrusion is rotated into a travel path of the rack portion protrusion, or the shaft second protrusion is rotated into engagement with the retention feature and then further in response to the rack portion sufficiently moving away from the first position toward the second position followed by application of the spring restoration force until the shaft first protrusion is urged into contact with the retention feature, the shaft second protrusion is urged into the travel path of the rack portion protrusion;

wherein upon the rack portion returning to the first position from the second position, the rack portion protrusion contacts the shaft second protrusion, urging the shaft second protrusion and the shaft first protrusion to rotate about the shaft axis, the shaft first protrusion rotating out of engagement with the retention feature, permitting the spring restoration force to urge movement of the shaft along the shaft axis until the end of the shaft contacts the surface of the rack portion;

wherein in response to the rack portion returning to the first position, the shaft and the rack portion aperture are brought into mutual alignment, and the spring restoration force urges movement of the shaft along the shaft axis until the end of the shaft is inserted inside of the rack portion aperture, thereby securing the rack portion to the frame in the first position.

15. The trailer of claim 14, wherein the first protrusion and the second protrusion are pins.

16. The trailer of claim 14 further comprises a power source for moving each rack portion of the rack assembly between the first position and the second position.

* * * * *